Figure 1:
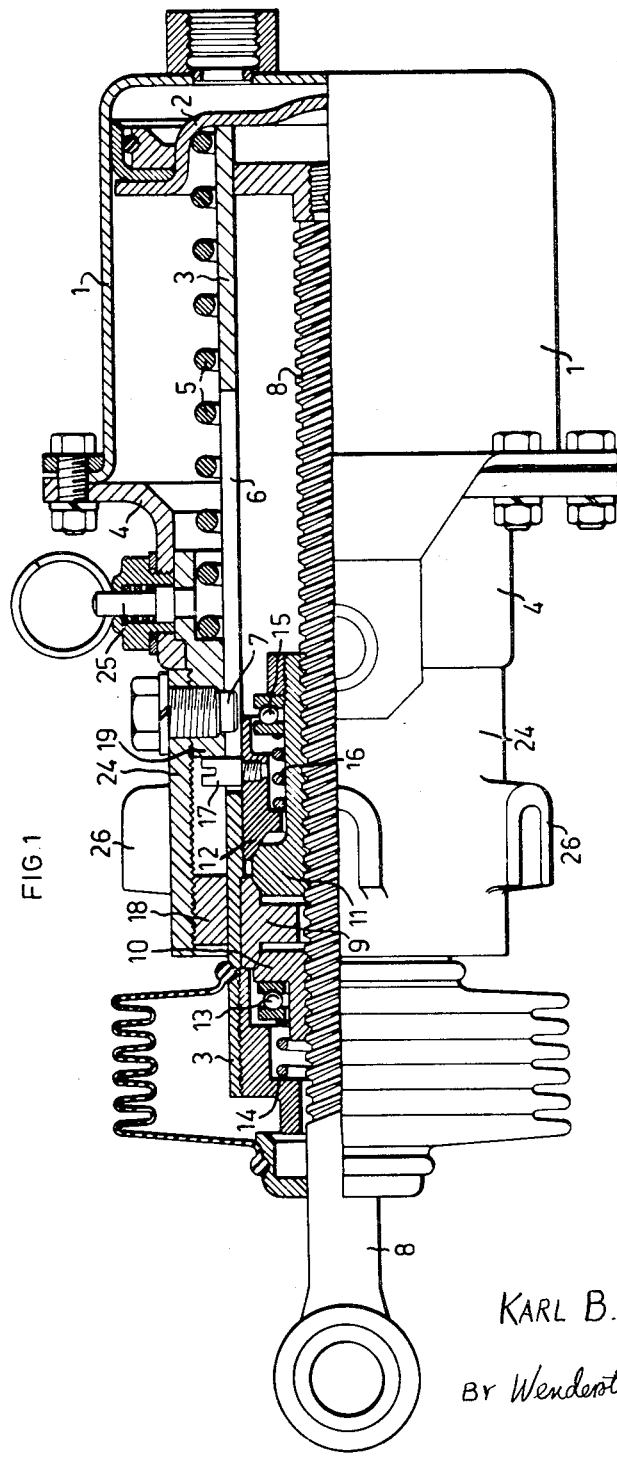

KARL B. LARSSON
INVENTOR

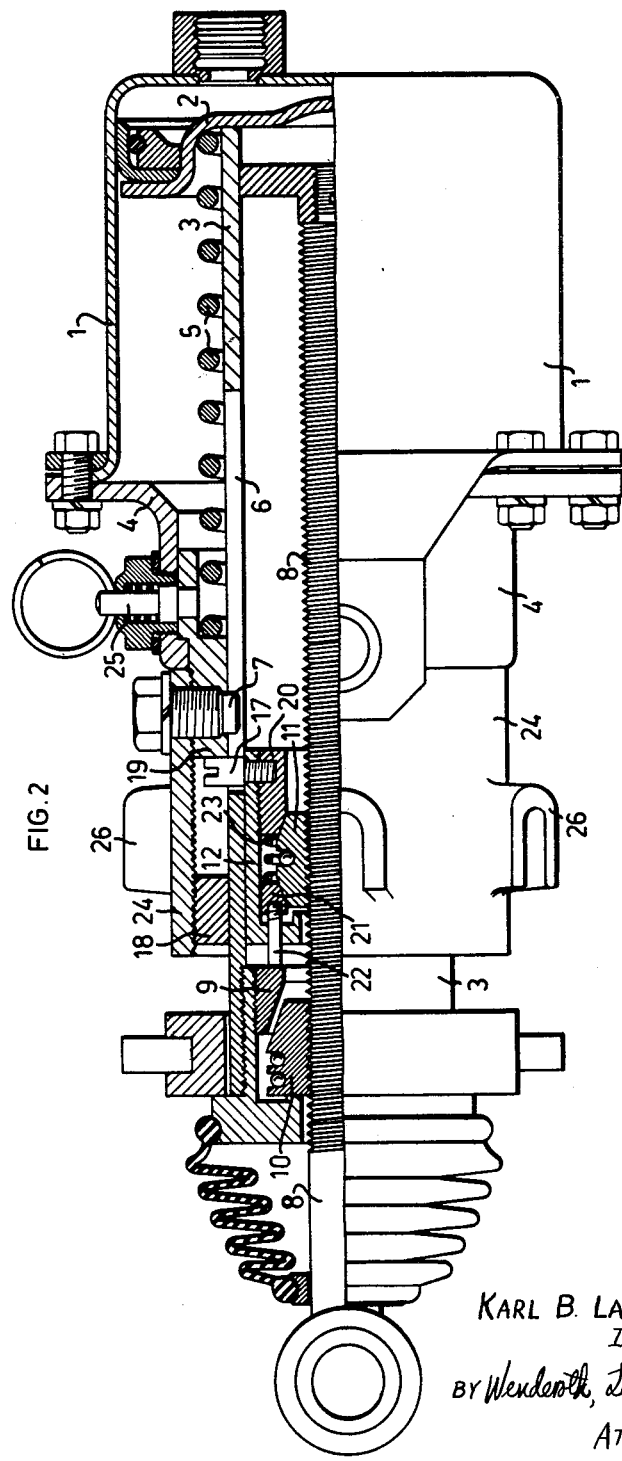

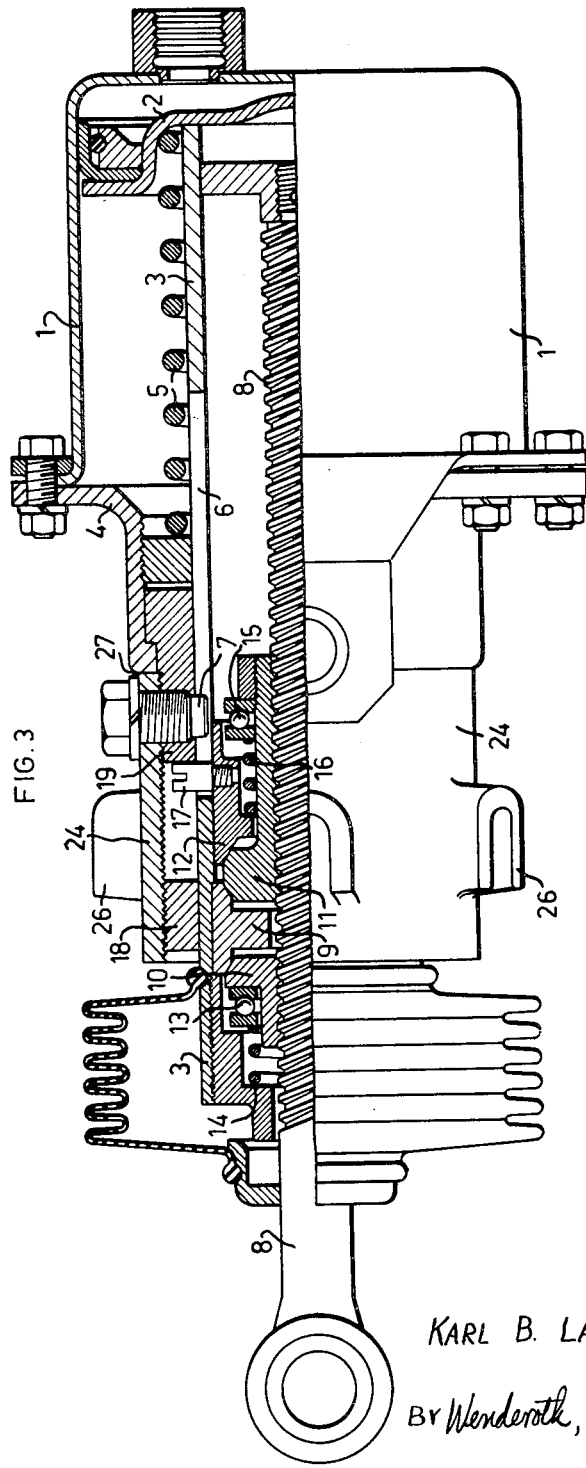

United States Patent Office 3,100,032
Patented Aug. 6, 1963

3,100,032
AIR BRAKE CYLINDER WITH A BUILT-IN AUTOMATIC BRAKE SLACK ADJUSTER
Karl Bertil Larsson, Malmo, Sweden, assignor to Svenska Aktiebolaget Bromsregulator, Malmo, Sweden, a corporation of Sweden
Filed May 7, 1962, Ser. No. 192,687
Claims priority, application Germany May 19, 1961
3 Claims. (Cl. 188—196)

This invention relates to an air brake cylinder with a built-in automatic brake slack adjuster for taking up excess slack in the brake rigging on release of the brake after a braking operation at which the travel of the brake piston in the brake cylinder exceeded a normal brake application stroke. More particularly the invention relates to an air brake cylinder with a projecting push rod and with a built-in automatic brake slack adjuster, in which the brake piston in the brake cylinder has a tubular piston rod guided in the front head of the brake cylinder, and in which the projecting push rod is disposed in the tubular push rod in telescoping relation thereto and is screw-threaded and engaged by two rotatable nuts, the first of which is housed in the tubular piston rod so as to partake in the movements thereof and transmit the brake power from the tubular piston rod onto the push rod during braking, while the second nut, through the intermediary of a control member movable together with the tubular piston rod in relation to the brake cylinder through a distance equal to a normal brake applying stroke, on release of the brake after a braking operation limits the return movement of the brake piston in the rear end position thereof at fully released brake.

In an air brake cylinder with a built-in brake slack adjuster of the above type, it is desirable that the paying-out of brake slack required when new brake shoes have to be substituted for worn ones, can be performed by screwing in the push rod by hand. To this end, the prior art has heretofore rotatably connected the front head of the push rod, by which the push rod is non-rotatably connected to the brake rigging operated by the push rod, with the push rod and to lock the push rod front head against rotation on the push rod by means of a pin removable to permit the push rod to be rotated by hand in relation to the non-rotatable push rod front head when the push rod has to be screwed in. This known construction has the disadvantage that removal and reinsertion of the pin is time-consuming and always entails the risk that after a removal of the pin the reinsertion thereof is forgotton or not performed with sufficient care to safe-guard against its falling out, thereby jeopardizing the correct automatic operation of the slack adjuster.

The invention has for its object the provision of an air brake cylinder with a built-in automatic slack adjuster of the type set forth, in which the disadvantage referred to above is overcome.

To achieve this object and such further objects as may appear from the following description of the invention and the illustration of different forms thereof on the accompanying drawings, the invention provides a slack adjuster in which the cylinder front head is divided into two parts, the first of which is rotatably connected with the second, which in turn is non-rotatably secured to the front end of the cylinder body, and further in which the tubular piston rod is non-rotatably guided in the rotatable first part of the cylinder front head so that at released brake it is possible to rotate the rotatable first cylinder front head part by hand and thereby also rotate the tubular piston rod and the two nuts on the screw-threaded push rod, provided that the latter is non-rotatably connected to the brake rigging. The rotation of the nuts on the screw-threaded push rod results in the desired axial displacement of the push rod in relation to the tubular piston rod. To safe-guard against unintentional rotation of the rotatable part of the cylinder front head, this part may be connected with the non-rotatable part of said head by means of a releasable latch or a separable clutch.

Because manual adjustment of the push rod axially in relation to the tubular piston rod can be performed simply by rotating the rotatable first part of the cylinder front head without loosening any connection of the push rod front head to the push rod or to the brake rigging, the push rod may be permanently non-rotatably connected to the brake rigging operated by the push rod.

In an air brake cylinder for a railway vehicle, for example, a spring for returning the brake piston into its rear end position in the brake cylinder on release of the brake after a braking operation is usually disposed in the brake cylinder between the cylinder front head and the brake piston. When a separable clutch is used for safeguarding against unintentional rotation of the rotatable part of the cylinder front head, said clutch preferably may consist of coacting clutch surfaces on the rotatable part and the non-rotatable part of the cylinder front head and said return spring, so arranged that the latter urges the coacting clutch surfaces against one another when the brake piston is in its rear end position at fully released brake. In this way the said spring is utilized not only for effecting the return movement of the brake piston in the brake cylinder but also for holding said clutch engaged when so required for safe-guarding against unintentional slack adjusting movement of the slack adjuster and, additionally, for obtaining by means of said coacting clutch surfaces an effective sealing of the joint between the rotatable part and the non-rotatable part of the cylinder front head against entrance of moisture and dirt into the built-in slack adjuster.

Referring to the accompanying drawings, FIGS. 1, 2 and 3 illustrate three different forms, each partly in plan view and partly in longitudinal section, of an air brake cylinder with a built-in brake slack adjuster according to the invention.

In all the forms shown, 1 denotes the air brake cylinder body, 2 the brake piston, 3 the tubular brake piston rod secured to the brake piston, 4 the base part of the cylinder front head, and 5 the brake piston return spring disposed in the brake cylinder between the brake piston 2 and the cylinder front head. The cylinder front head is divided into the base part 4 bolted to the front end of the cylinder body 2 and an extension sleeve 24 which is rotatable about the longitudinal axis of the brake cylinder by hand when the brake piston 2 is in the rear end position at fully released, the position shown in the drawings. The tubular piston rod 3 and the extension sleeve 24 are non-rotatably connected with each other, and to this end the tubular piston rod 3 has longitudinal slots 6, and the extension 24 has studs 7 engaged in said slots 6. In the extension sleeve 24 there are two abutments 18 and 19 for limiting the axial movement of the control member 12 which to this end has studs 17 projecting through the slots 6 and movable between the two abutments 18 and 19 in relation to the brake cylinder 1 through a distance equal to a normal brake applying stroke of the brake piston 2. The control member 12 consists of a sleeve which is axially slidable in but not rotatable in relation to the tubular brake piston rod 3. The push rod 8, which has a front head for its connection to the brake rigging to be operated by the brake cylinder, is disposed in telescoping relation in the tubular brake piston rod 3 and is screw-threaded and carries two nuts 10 and 11 rotatably engaging the threads of the push rod. The abutment ring 9 disposed between the two nuts 10 and 11 for coaction with them is secured in the tubular piston rod 3.

In the forms of FIGS. 1 and 3 the coacting threads of the push rod 8 and the nuts 10 and 11 are of such a lead as to make them non-selflocking, and the nuts 10 and 11 are threaded onto the push rod 8 and are axially displaceable thereon only when rotated. The first nut 10 is housed in the tubular piston rod 3 so as to partake in the movements thereof and is acted upon in the direction toward the abutment ring 9 by a spring 14 through the intermediary of an anti-friction thrust bearing 13. The control sleeve 12 is acted upon in the other direction toward the abutment ring 9 by a spring 16 supported from the second nut 11 through the intermediary of an anti-friction thrust bearing 15.

In the form of FIG. 2, the screw-threaded push rod 8 and the nuts 10 and 11 thereon are so constructed (the nuts being divided into resiliently interconnected segments) that the nuts do not rotate on the push rod during axial displacement of the same on the push rod 8 such as takes place at automatic operation of the slack adjuster, but move over the threads of the push rod, so that the push rod acts as a toothed bar and the nuts act as pawls or ratchets. The second nut 11 coats with the abutment ring 9 in the tubular piston rod 3 through the intermediary of an abutment ring 21 which is slidable in the control sleeve 12 and provided with pins 22 axially projecting toward the abutment ring 19. The control sleeve 12 is provided with an abutment ring 20 which coacts with the second nut 11, and a spring 23 is disposed between the two abutments 20 and 21, urging them away from each other.

In the forms of FIGS. 1 and 2, the manually rotatable first part 24 of the cylinder front head is normally locked to the base part 4 of said head by means of an easily releasable latch 25 so that it cannot rotate, whereas in the form of FIG. 3 a separable clutch is provided between said first part 24 and said base part 4, and this separable clutch offers sufficient safety against unintentional rotation of the first part 24 of the cylinder front head at released brake. According to the illustrated form of this clutch, the rotatable first part 24 and the base part 4 of the cylinder front head have at 27 abutting end faces constituting cooperating friction clutch faces urged against each other at released brake by the brake piston return spring 5. This construction of the clutch is such that at released brake the brake piston return spring 5, which is supported against the base part 4 of the cylinder front head, acts upon the rotatable first part 24 of said cylinder front head in the return direction via the brake piston 2, the tubular brake piston rod 3 secured to said brake piston, the abutment ring 9, the second nut 11, and the control sleeve 12 associated therewith.

In all the forms shown and described, the automatic brake slack adjuster operates as follows at brake application and release. During braking, the first nut 10 transmits the brake power between the tubular brake piston rod 3 and the push rod 8. When the brake application stroke does not exceed the desired value, the control sleeve 12 is not displaced in relation to the tubular brake piston rod 3. Should this value be exceeded due to too large brake shoe clearances, the coaction of the studs 17 with the abutment 18 stops the control sleeve 12 and displaces it together with the second nut 11 in relation to the tubular brake piston rod 3 and the push rod 8 in the slack reducing direction through a distance equal to the amount by which said value is exceeded. During the subsequent release of the brake, the first nut 10 is also displaced on the push rod 8 in the slack reducing direction. At released brake, the force of the brake piston return spring 5 is transmitted onto the abutment 19 through the intermediary of the tubular brake piston rod 3, the abutment ring 9 engaging the second nut 11 and thereby locking it on the push rod 8, and the control sleeve 12 which by its studs 17 engages the abutment 19. Thus, the brake piston 2 never engages the cylinder bottom.

As the first part 24 of the cylinder front head and the tubular piston rod 3 non-rotatably connected therewith are rotatable in relation to the brake cylinder 1, the non-rotatable connection of the push rod 8 with the brake rigging and the construction of said push rod 8 as a screw-threaded spindle on which the nuts 10 and 11 are axially displaced when rotated, make it possible, without any dismounting of the brake cylinder with its built-in slack adjuster, to perform any desired manual adjustment of the brake slack at released brake simply by rotating the rotatable first part 24 of the cylinder front head after release of the latch 25, in the forms of FIGS. 1 and 2, or by overcoming the limited resistance offered by the separable clutch 27 in the form of FIG. 3, in that both nuts 10 and 11 will be carried along in any such rotation and thereby will be axially displaced on the push rod 8. The first part 24 of the cylinder front head is preferably provided with lugs 26 with which a suitable hand tool can be engaged for rotation of the said first rotatable cylinder front head part 24.

If the slack adjuster is provided with a releasable latch 25, as in the forms of FIGS. 1 and 2, the support for the brake piston return spring 5 in the brake cylinder should preferably be provided for in the rotatable first part 24 of the cylinder front head and partake in the rotation thereof.

What I claim and desire to secure by Letters Patent is:

1. An air brake cylinder with a built-in automatic brake slack adjuster, comprising, in combination, a cylinder body, a cylinder front head divided into two parts of which the first is rotatable about the axis of the cylinder in relation to the second which is non-rotatably secured to said cylinder body, a brake piston movable in said cylinder body, a tubular brake piston rod secured to said brake piston and axially guided in said cylinder front head and non-rotatably connected with said rotatable first part of said cylinder front head, a screw-threaded push rod disposed in said tubular brake piston rod in telescoping relation thereto and adapted to be non-rotatably connected with a brake rigging to be operated by the brake cylinder, two nuts provided on said push rod and rotatably engaged with the screw threads thereof, the first of which nuts is housed in said tubular brake piston rod so as to partake in the movements thereof and transmit the brake power from said tubular piston rod onto said push rod at braking, a control member movable along said tubular brake piston rod and abuttable by the second nut for limiting axial movement thereof in relation to said cylinder front head to a distance equal to a normal brake applying stroke of said brake piston and for limting return movement of said brake piston in the rear end position thereof at released brake, and an abutment provided in said tubular piston rod in front of said second nut and engageable therewith for locking it on said screw-threaded push rod.

2. An air brake cylinder with a built-in automatic brake slack adjuster as claimed in claim 1, and a releasable latch mounted on said non-rotatable second part of said cylinder front head and normally engaged with said rotatable first part for locking it against rotation.

3. An air brake cylinder with a built-in automatic brake slack adjuster as claimed in claim 1 and with a return spring for said brake piston in the brake cylinder, and a separable clutch between said rotatable and non-rotatable parts of said cylinder front head, which clutch comprises coacting clutch faces on said parts urged against one another by the pressure of said brake piston return spring when said brake piston is in its rear end position in the brake cylinder at released brake.

References Cited in the file of this patent

UNITED STATES PATENTS 3,043,406     Larsson _____ July 10, 1962